United States Patent [19]

Klar

[11] 3,940,627
[45] Feb. 24, 1976

[54] SHIELDED-EMITTER NEUTRON DETECTOR

[75] Inventor: Erich Klar, Erlangen, Germany

[73] Assignee: Siemens Aktiengesellschaft, Munich, Germany

[22] Filed: Aug. 1, 1974

[21] Appl. No.: 493,904

[30] Foreign Application Priority Data
Aug. 1, 1973  Germany............................ 2339004

[52] U.S. Cl. .............................................. 250/390
[51] Int. Cl.² ............................................ G01T 3/00
[58] Field of Search ...................... 250/390, 391, 392

[56] References Cited
UNITED STATES PATENTS
3,390,270  6/1968  Treinen et al. ..................... 250/390

*Primary Examiner*—Davis L. Willis
*Attorney, Agent, or Firm*—Kenyon & Kenyon Reilly Carr & Chapin

[57] ABSTRACT

A self-powered neutron detector has a neutron-sensitive emitter, a collector enclosing this emitter and insulation between these two components. When irradiated by neutrons, the emitter generates Compton electrons so that a current is produced between the emitter and electrode and which may be used with a current-measuring device to provide a readout. The emitter is enclosed and electrically connected with a metal which is substantially neutron-insensitive so that the detector provides a substantially true and prompt signal accurately reflecting the neutron flux density received by the detector.

6 Claims, 1 Drawing Figure

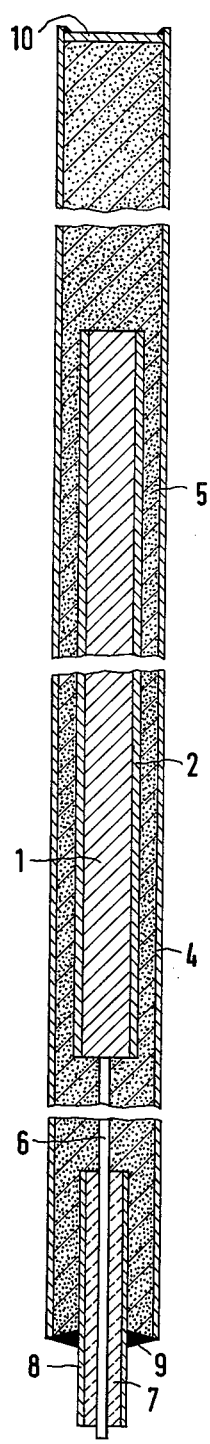

SHIELDED-EMITTER NEUTRON DETECTOR

BACKGROUND OF THE INVENTION

Self-powered neutron detectors are known, as exemplified by the U.S. Treinen et al. U.S. Pat. No. 3,390,270, dated June 25, 1968.

To provide such a detector with a service life long enough to permit its practical use in the internal instrumentation of a reactor core, such as a pressurized-water reactor core, the Klar U.S. application Ser. No. 306,940, filed Nov. 15, 1972, discloses the use of thulium 169 as the emitter material. Generally speaking, suitable emitter materials are also sensitive to gamma radiation so that a falsified signal may result, and to compensate for gamma radiation sensitivity, the Klar et al. U.S. application Ser. No. 386,439, filed Aug. 7, 1973, discloses the type of detector, such as disclosed by the Treinen et al patent, provided with a second emitter material having a gamma sensitivity but which is substantially insensitive to neutron flux, whereby the detector produces two outputs which by suitable instrumentation provides a signal which is gamma compensated.

The provision of a detector of the Treinen et al patent type, but using thulium 169 as the emitter material, is desirable because of its simplicity, providing the detector can be made so that it avoids a falsified signal due not only to gamma radiation, but also because of interference signals based on secondary effects which are time-delayed.

SUMMARY OF THE INVENTION

With the above in mind, the object of the present invention is to produce a neutron detector of simple construction, producing unfalsified signals accurately reflecting the neutron flux density to which the detector is exposed, and which is a detector suitable for the core instrumentation of, for example, a pressurized-water reactor.

According to the invention, the emitter, preferably thulium 169, is sheathed or clad by a metal tube which, for all practical purposes, is neutron-insensitive, this tube or cladding being electrically connected with the emitter made of neutron-sensitive material. Detectors of the type under discussion ordinarily use a collector which is tubular, the emitter ordinarily being cylindrical or rod-shaped and dielectric insulation being compacted between these two components so that the emitter is held in position by the insulation. A two-conductor electric cable has one conductor connected to the emitter and the other to the collector, the tubular collector having both of its ends otherwise sealed. With the present invention, the tube of neutron-insensitive metal encases or clads the emitter, this being sufficient for the electrical connection between these two components.

When in use in the core, beta rays which release the delayed signal are reduced by the tube or cladding of the emitter. On the other hand, Compton electrons attributable to the prompt, n-gamma process, are generated primarily in the insulation and are fully effective to provide a signal. Therefore, the detector's neutron sensitivity with respect to its neutron irradiation, remains intact while interference signals are reduced if not eliminated.

Another advantage is that the current component based on the gamma radiation can be strengthened or weakened by means of the metal tube or cladding enclosing the emitter. This makes it possible to obtain a gamma compensation as taught by the Klar et al U.S. application Ser. No. 386,439 requiring in one way or another two separate components encased by the collector via the insulation. For example, to weaken the gamma-responsive current, zirconium may be used for the tube or cladding around the emitter, if the atomic number of the emitter material is no higher than that of the collector material, as exemplified by a cobalt emitter, it being necessary that the encasing collector is of a suitable corrosion and temperature resistant material. If the emitter material has an atomic number higher than that of the collector material, as exemplified by rhenium and thulium, the gamma currents can advantageously be compensated by a sheath or cladding of Inconel 600 the well known nickel-iron-chromium alloy used for nuclear reactor components.

To optimize both effectiveness and cost, the wall thickness of the tube or cladding enclosing the emitter, may only be from 10 to 25 percent of the emitter diameter, assuming the latter is rod-shaped.

BRIEF DESCRIPTION OF THE DRAWING

The preferred mode for carrying out the invention is illustrated in longitudinal section by the accompanying drawing.

DETAILED DESCRIPTION OF THE INVENTION

Having reference to the above drawing, the self-powered neutron detector suitable for the core instrumentation of a pressurized-water reactor and which is useful as an indicator for scramming the reactor, if necessary, is shown as being approximately 30 cm in overall length. Its components are cylindrical and symmetrical with respect to each other. The rod-shaped emitter 1 consists of thulium 169, 27 cm long, or in other words, slightly shorter than the overall length of the detector. The emitter is enclosed by a metal tube or cladding 2 made of Inconel 600, and the tube wall thickness is approximately from 10 to 25 percent of the diameter of the emitter 1. The actual dimensions are a 0.3 mm wall thickness for a 2 mm emitter diameter. The emitter and tube or cladding 2 are electrically interconnected, in this instance simply by the tube's inside being in firm engagement with the emitter.

The emitter is concentrically within the cylindrical collector 4 which functions also as the protective jacket for the detector, and this collector is also made of Inconel 600, having a wall thickness of 0.3 mm for a 4.5 mm overall diameter. The insulation between the collector and the tube or cladding 2 is aluminum oxide.

For conducting the current to the readout instrumentation, a ceramically insulated cable 7 has metal armor 8 which via a welded joint 9 is connected with the collector and protective jacket 4, both ends of this jacket being hermetically sealed closed as by the welded part 9, this part and the welded closure 10 at the other end, both being made of the same metal as is the collector. The armored cable's conductor 6, of course, connects with the emitter 1 which is an electrical connection with its enclosing tube of cladding 2.

When in operation, in the core instrumentation of a pressurized-water reactor, the long half-life interference currents, otherwise originating in the reactor after a certain operating period, are suppressed. Also, the tube or cladding 2 weakens or attenuates the gamma signal which would otherwise cause interference with the desired signal. With the specific materials referred to and the dimensions disclosed, an almost complete compensation of the gamma signal is obtained.

The invention provides a manufacturing advantage because when the neutron sensitive material of the emitter 1 is in the form of a powder, such material, which would otherwise be hard to handle, may be easily compacted into the tube 2 so that it is permanently positioned within the insulation 5 which is also normally a powder.

What is claimed is:

1. A self-powered neutron detector comprising a neutron-sensitive emitter, a collector enclosing said emitter, and insulation between said emitter and collector; wherein the improvement comprises said emitter being enclosed by a metal which is neutron-insensitive relative to said emitter and means for electrically interconnecting said metal and emitter.

2. The detector of claim 1 in which said collector is tubular and encloses said insulation, said metal being formed as a tube enclosing said emitter, and said means being formed by contact between said tube and emitter, said emitter being rod-shaped.

3. The detector of claim 2 in which said emitter is a material having an atomic number no higher than that of material comprising said collector, and said tube comprises zirconium.

4. The detector of claim 2 in which said emitter is made of material selected from the class consisting of rhenium and thulium and said tube is made of a nickel-iron-chromium alloy.

5. The detector of claim 4 in which said tube has a wall thickness of about 10 to 25 percent of the thickness of said emitter.

6. The emitter of claim 4 in which said emitter comprises a powder held within said tube.

* * * * *